(12) United States Patent
Bowden et al.

(10) Patent No.: US 8,778,186 B2
(45) Date of Patent: Jul. 15, 2014

(54) HIGH-DENSITY POLYDICYCLOPENTADIENE

(75) Inventors: Ned B. Bowden, Iowa City, IA (US);
Abhinaba Gupta, Iowa City, IA (US);
Tyler R. Long, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 13/546,252

(22) Filed: Jul. 11, 2012

(65) Prior Publication Data

US 2013/0020262 A1    Jan. 24, 2013

Related U.S. Application Data

(60) Provisional application No. 61/506,528, filed on Jul. 11, 2011.

(51) Int. Cl.
*B01D 71/56* (2006.01)
*B01D 71/26* (2006.01)

(52) U.S. Cl.
USPC ........... 210/654; 210/649; 210/650; 210/651; 210/653; 210/500.1; 210/500.21; 210/500.27; 210/500.28; 210/500.33; 210/490

(58) Field of Classification Search
USPC .................. 210/649–654, 500.1–500.43, 490
See application file for complete search history.

(56) References Cited

U.S. PATENT DOCUMENTS

| | | | |
|---|---|---|---|
| 4,729,976 A | 3/1988 | Sjardijn et al. | |
| 4,810,762 A | 3/1989 | Sjardijn et al. | |
| 5,061,521 A | 10/1991 | Endo et al. | |
| 5,081,208 A | 1/1992 | Sjardijn | |
| 5,248,745 A | 9/1993 | Sjardijn et al. | |
| 5,683,356 A | 11/1997 | Halperin et al. | |
| 5,895,800 A | 4/1999 | Kataoka et al. | |
| 6,018,060 A | 1/2000 | Baker et al. | |
| 6,433,101 B1 | 8/2002 | Woodson et al. | |
| 7,084,222 B2 | 8/2006 | Sakamoto et al. | |
| 7,084,284 B2 * | 8/2006 | Miller | 549/541 |

(Continued)

FOREIGN PATENT DOCUMENTS

WO    WO 2006/071470 A2    7/2006

OTHER PUBLICATIONS

Long et al "Selective flux of organic liquids and solids using nanoporous membranes of polydicyclopentadiene", J. Mater. Chem., 2011, 21, 14265-14276.*

(Continued)

*Primary Examiner* — Lore Jarrett
*Assistant Examiner* — Benjamin J Behrendt
(74) *Attorney, Agent, or Firm* — Viksnins Harris & Padys PLLP

(57) ABSTRACT

The invention provides a method of contacting a membrane having a highly cross-linked polydicyclopentadiene matrix with a feed solution having a) a first component with a molecular weight in the range of from about 100 g mol$^{-1}$ to about 600 g mol$^{-1}$ and a cross-sectional area of less than about 0.40 nm$^2$ and b) a second component with a molecular weight in the range of from about 100 to about 600 grams g mol$^{-1}$ and a cross-sectional area of greater than about 0.50 nm$^2$ so that the feed solution is fractionated into a permeate comprising the first component and a retentate enriched in the second component.

10 Claims, 4 Drawing Sheets

(56) References Cited

U.S. PATENT DOCUMENTS

| | | | |
|---|---|---|---|
| 8,227,635 B2 | 7/2012 | Bowden et al. | |
| 2008/0023884 A1 | 1/2008 | Konze et al. | |
| 2008/0142454 A1* | 6/2008 | Emrick et al. | 210/767 |
| 2008/0281090 A1 | 11/2008 | Lee et al. | |
| 2010/0010185 A1 | 1/2010 | Bowden et al. | |

OTHER PUBLICATIONS

Gupta et al "Retention of palladium and phosphine ligands using nanoporous polydicyclopentadiene thimbles", J. Mater. Chem., 2011, 21, 14265-14276.*

Perring et al "Epoxidation of the surface of polydicyclopentadiene for the self-assembly of organic monolayers", J. Mater. Chem., 2010, 20, 8679-8685.*

Phillip et al "Diffusion and Flow Across Nanoporous Polydicyclopentadiene-Based Membranes" vol. 1, No. 2, 472-480, 2009.*

Vandezande et al "Solvent resistant nanofiltration: separating on a molecular level", Chemical Society Review, DOI:10.1039/b610848m.*

See Toh et al, "Polymeric membranes for nanofiltration in polar aprotic solvents", vol. 301, Issues 1-2, Sep. 1, 2007, pp. 3-10.*

Grodowska, Katarzyna, and Andrzej, Parczewski. "Organic solvents in the pharmaceutical industry." Acta Plo Pharm 67 (2010): 3-12.*

ScienceLab.com, "Dichloromethane MSDS", Apr. 19, 2005.*

Perring, Mathew, Tyler R. Long, and Ned B. Bowden. "Epoxidation of the surface of polydicyclopentadiene for the self-assembly of organic monolayers." Journal of Materials Chemistry 20.39 (2010): 8679-8685.*

Miller, A. Lee, and Ned B. Bowden. "A Materials Approach to the Dual-Site Isolation of Catalysts Bonded to Linear Polymers and Small, Ionic Molecules for Use in One-Pot Cascade Reactions." Advanced Materials 20.21 (2008): 4195-4199.*

ChemAxon. Chemical Data. Copper (II) Chloride.*
ChemAxon. Chemical Data. 4-Nitrobenzaldehyde.*
ChemAxon. Chemical Data. p-Toluenesulfonic acid.*

Alberts et al., "Food and the Derivation of Cellular Energy", *Molecular Biology of the Cell*, 2nd Ed., Garland Publishing, Inc., 64-69 (1989).

Asatekin et al., "Polymeric Nanopore Membranes for Hydrophobicity-Based Separations by Conformal Initiated Chemical Vapor Deposition", *Nano Lett.*, 11, 677-686 (2011).

Bellan et al., "Poly(dicyclopentadiene) Submicron Fibers Produced by Electrospinning", *Macromol. Rap. Comm.*, 27, 511-515 (2006).

Bowden, N.B., seminar at the University of Iowa, Iowa City, IA, 16 pages, (Oct. 2007).

Bowden, N.B., "A Grignard reaction in water? New methods to carry out green cascade reactions using simple polymer thimbles", Department presentation at the University of Iowa, Iowa City, IA, 49 pages, (Nov. 2007).

Chen et al., "Metal—Organic Frameworks with Functional Pores for Recognition of Small Molecules", *Acc. Chem. Res.*, 43 (8), 1115-1124 (2010).

Dijkstra et al, "The Use of Ultra- and Nanofiltration Techniques in Homogeneous Catalyst Recycling", *Acc. Chem. Res.*, 35, 798-810 (2002).

Dijkstra et al., "A transport model for organophilic nanofiltration", *J. Mem. Sci.*, 286, 60-68 (2006).

Geens et al., "Removal of API's (Active Pharmaceutical Ingredients) from Organic Solvents by Nanofiltration", *Sep. Sci. Technol.*, 42, 2435-2449 (2007).

Gould et al., "Membrane Separation in Solvent Lube Dewaxing", *Environ. Prog.*, 20, 12-16 (2001).

Hupp et al., "Liquid/Liquid Interface Polymerized Porphyrin Membranes Displaying Size-Selective Molecular and Ionic Permeability", *Langmuir*, 22, 1804-1809 (2006).

Jirage et al., "Nanotubule-based molecular-filtration membranes", *Science*, 278, 655-658 (1997).

Lee et al., "Thermal Analysis of Ring-Opening Metathesis Polymerized Healing Agents", *J. Polym. Sci., Part B: Polym. Phys*, 45, 1771-1780 (2007).

Liu et al., "Understanding gas separation in metal—organic frameworks using computer modeling", *J. Mater. Chem.* 20, 10308-10318 (2010).

Martin et al., "Investigations of the Transport Properties of Gold Nanotubule Membranes", *J. Phys. Chem. B*, 105, 1925-1934 (2001).

Martina et al., "Macroporous Poly(dicyclopentadiene) Beads", *J. Appl. Polym. Sci.*, 96, 407-415 (2005).

Miller et al., "A Materials Approach to the Dual-Site Isolation of Catalysts Bonded to Linear Polymers and Small, Ionic Molecules for Use in One-Pot Cascade Reactions", *Advanced Materials*, 20(21), 4195-4199 and 7 pages of supporting information, (2008).

Miller et al., "Site-isolation and recycling of PdCl2 using PDMS thimbles", *J. Org. Chem.*, 74(13), 4834-40 and 12 pages of supporting information, (2009).

Mueller et al., "Metal—organic frameworks—prospective industrial applications", *J. Mater. Chem.* 16, 626-636 (2006).

Muller et al., "Design and Evaluation of Inclusion Resolutions, Based on Readily Available Host Compounds", *Eur. J. Org. Chem.*, 1082-1096 (2005).

Mwangi, et al., "Occlusion of grubbs' catalysts in active membranes of polydimethylsiloxane: catalysis in water and new functional group selectivities", *J. Am. Chem. Soc.*, 128(45), 14434-14435 and 16 pages of supporting information, (2006).

Mwangi, M.T. and N.B. Bowden, "A new approach to cascade reactions using site-isolated catalysts and/or reagents", 8th International Symposium on Carbanion Chemistry (ISCC-8), University of Wisconsin, Madison, WI, 3 pages, (Jun. 6-10, 2007).

Mwangi et al., "'Pot-in-pot' reactions: Site isolation of organometallic catalysts and reagents for otherwise impossible cascade reactions", 42nd Midwest Regional ACS Meeting, Nov. 7-10, Kansas City, KS, 9 pages, (2007).

Mwangi et al., "A materials approach to site-isolation of Grubbs catalysts from incompatible solvents and m-chloroperoxybenzoic acid", *Chemistry: a European Journal*, 14(22), 6780-6788 and 20 pages of supporting information, (2008).

Mwangi et al., "Sequential Reactions with Grubbs Catalyst and AD-mix-α/β Using PDMS Thimbles", *Org. Lett.*, 11(1), 33-36 and 24 pages of supporting information, (2009).

Nair et al., "Extending Ru-BINAP Catalyst Life and Separating Products from Catalyst Using Membrane Recycling", *Org. Proc. Res. Dev.*, 13, 863-869 (2009).

Patterson et al., "Membrane selectivity in the organic solvent nanofiltration of trialkylamine bases", *Desalination*, 218, 248-256 (2008).

Peeva et al., In *Comprehensive membrane science and engineering*;Drioli, E., Giorno, L., Eds.; Elsevier: Boston, 2010, vol. 2 p. 91-111.

Peplow, M., "'Pot-in-a-pot' technique makes impossible cascade reactions easy", *Chemistry World*, 2 pages, (Apr. 10, 2008).

Perring, M. and N.B. Bowden, "Assembly of organic monolayers on polydicyclopentadiene", *Langmuir*, 24(18), 10480-10487, (Sep 16, 2008) (Epub Aug. 8, 2008).

Pink et al., "Organic Solvent Nanofiltration and Adsorbents; A Hybrid Approach to Achieve Ultra Low Palladium Contamination of Post Coupling Reaction Products", *Org. Proc. Res. Dev.*, 12, 589-595 (2008).

Rule et al., "ROMP Reactivity of *endo*- and *exo*-Dicyclopentadiene", *Macromolecules*, 35, 7878-7882 (2002).

Runge, et al., "New selectivities from old catalysts. Occlusion of Grubbs' catalysts in PDMS to change their reactions", *J. Organomet. Chem.*, 691, 5278-5288, (2006).

Runge et al., "Cascade Reactions Using LiAlH4 and Grignard Reagents in the Presence of Water", *Angew. Chem. Int. Ed.*, 47, 935-939 and 16 pages of supporting information, (2008).

Schmidt et al, "Application of Process Moedelling Tools in the Scale-Up of Pharmaceutical Crystallisation Processes", *Org. Process Res. Dev.*, 8, 998-1008 (2004).

See-Toh et al., "In search of a standard method for the characterization of organic solvent nanofiltration membranes", *J. Mem. Sci.*, 291, 120-125 (2007).

(56) References Cited

OTHER PUBLICATIONS

See-Toh et al., "Controlling molecular weight cut-off curves for highly solvent stable organic solvent nanofiltration (OSN) membranes", *J. Mem. Sci.*, 324, 220-232 (2008).

Silva et al., "Nanofiltration in Organic Solvents", *Adv. Membr. Technol. Appl.*, 451-467 (2008).

Snurr et al., "Prospects for Nanoporous Metal-Organic Materials in Advanced Separations Processes", *AIChE Journal*, 50 (6), 1090-1095 (2004).

Thomas, "Adsorption and desorption of hydrogen on metal—organic framework materials for storage applications: comparison with other nanoporous materials", *Dalton Tran.*, 1487-1505 (2009).

Wikipedia, http://en.wikipedia.org/wiki/Citric.sub.--acid.sub.--cycle , 8 pages (2011).

Wikipedia, http://en.wikipedia.org/wiki/Isocitrate.sub.--dehydrogenase, 10 pages (2011).

Wikipedia, http://en.wikipedia.org/wiki/Pyruvate.sub.--dehydrogenase, 6 pages (2011).

Wirtz et al., "Molecular Sieving and Sensing with Gold Nanotube Membranes", *Chem. Rec.*, 2, 259-267 (2002).

Zhao et al., "Tuning the Topology and Functionality of Metal—Organic Frameworks by Ligand Design", *Acc. Chem. Res.*, 44 (2), 123-133 (2011).

Zou et al., "Storage and separation applications of nanoporous metal—organic grameworks", *CrystEngComm*, 12, 1337-1353 (2010).

\* cited by examiner

HIGH-DENSITY POLYDICYCLOPENTADIENE

GOVERNMENT FUNDING

This work was supported by the National Science Foundation Grant CHE-0848162. The United States Government has certain rights to this invention.

RELATED APPLICATION

This application claims the benefit of priority of U.S. Provisional Application Ser. No. 61/506,528 filed on Jul. 11, 2011, which application is herein incorporated by reference.

BACKGROUND OF THE INVENTION

Semipermeable membranes play an important part in industrial processing technology and other commercial and consumer applications. Examples of their applications include, among others, biosensors, transport membranes, drug delivery systems, water purification systems, optical absorbers, and selective separation systems for aqueous and organic liquids carrying dissolved or suspended components.

Generally, semipermeable membranes operate in separation devices by allowing only certain components of a solution or dispersion to preferentially pass through the membrane. The fluid that is passed through the membrane is termed the permeate and comprises a solvent alone or in combination with one or more of the other agents in solution. The components that do not pass through the membrane are usually termed the retentate. The permeate and/or retentate may provide desired product.

Membranes are one of the most common and economically efficient methods to purify active pharmaceutical ingredients (API) in industry and provide a critical alternative to distillations, recrystallizations, and column chromatography (B. Schmidt, et al., Org. Process Res. Dev. 2004, 8, 998-1008; and S. Muller, et al., Eur. J. Org. Chem. 2005, 1082-1096). Distillations require that an API be stable to elevated temperatures and require significant amounts of energy to complete. Recrystallizations often result in APIs with high purities, but not every molecule can be recrystallized and the recyrstallization conditions are often difficult to optimize and scale up to an appropriate level. In addition, the formation of multiple crystalline isomorphs is poorly understood and results in APIs with different delivery characteristics in the body. Column chromatography is often used in the early discovery and development of APIs due to its simplicity and success, but it is not widely used for large scale production of APIs due in part to the large volumes of solvents that are used which necessitate further purification.

In contrast, the use of nanoporous membranes to purify APIs can be readily scaled up to purify large quantities of product, use little energy, and does not require large amounts of solvent (H. P. Dijkstra, et al., Acc. Chem. Res. 2002, 35, 798-810; M. F. J. Dijkstra, et al., J. Mem. Sci. 2006, 286, 60-68; J. Geens, et al., Sep. Sci. Technol. 2007, 42, 2435-2449; C. J. Pink, et al., Org. Proc. Res. Dev. 2008, 12, 589-595; and P. Silva, et al., Adv. Membr. Technol. Appl. 2008, 451-467). The use of nanoporous membranes in industry is common in aqueous separations or to purify gasses by pervaporation, but nanoporous membranes are used less commonly with organic solvents. A breakthrough was realized in 1990 when nanoporous membranes based on "organic solvent nanofiltration" (OSN) membranes were used in an ExxonMobil refinery to separate oil from dewaxing solvents (R. M. Gould, et al., Environ. Prog. 2001, 20, 12-16). The next generation of OSN membranes based on cross-linked polyaniline, polyimides, and other polymers and sold as StarMem™, Duramem™, and PuraMem™ have been developed that function in a wide range of organic solvents and separate organic molecules dissolved in organic solvents (D. A. Patterson, et al., Desalination 2008, 218, 248-256; Y. H. See-Toh, et al., J. Mem. Sci. 2008, 324, 220-232; Y. H. S. Toh, et al., J. Mem. Sci. 2007, 291, 120-125; and L. G. Peeva, et al., In Comprehensive membrane science and engineering; Drioli, E., Giorno, L., Eds.; Elsevier: Boston, 2010; Vol. 2, p 91-111).

All OSN membranes report values for the "molecular weight cutoff" (MWCO) that correspond to the molecular weight where molecules transition from having high to low values of permeation (Y. H. S. Toh, et al., J. Mem. Sci. 2007, 291, 120-125; and L. G. Peeva, et al., In Comprehensive membrane science and engineering; Drioli, E., Giorno, L., Eds.; Elsevier: Boston, 2010; Vol. 2, p 91-111). Simply, molecules below the MWCO permeate the membranes but molecules above the MWCO have significantly reduced permeation and are retained. The use of membranes that feature a MWCO has limitations for the separation of catalysts from APIs because the ligands on a catalyst often have molecular weights that are similar to that of the product. Thus, ligands such as $PPh_3$ (MW: 262 g mol$^{-1}$), $PCy_3$ (MW: 280 g mol$^{-1}$), and binol (MW: 286 g mol$^{-1}$) can be very challenging to separate from APIs with similar molecular weights or impossible to separate if an API has a higher molecular weight.

The state-of-the-art membranes to separate catalysts from the products of reactions are based on highly cross-linked organic polymers that function in a range of organic solvents. For instance RuBINAP catalyst (molecular weight 795 g mol$^{-1}$) was retained by OSN membranes at levels of approximately 98% for multiple cycles and was active for long periods of time (D. Nair, et al., Org. Proc. Res. Dev. 2009, 13, 863-869). The product was allowed to permeate the membranes and was isolated on the side of the membrane opposite of the catalyst. Part of the success of this project was the high molecular weight of the catalyst compared to the product (molecular weight 160 g mol$^{-1}$) which allowed the catalyst to have a molecular weight significantly higher than the MWCO of the membrane (220 g mol$^{-1}$).

In other work, the flux of trialkylamines (i.e. $NR_3$ where R is methyl, ethyl, propyl, etc) through commercially available OSN membranes (StarMem™ membranes) were studied (D. A. Patterson, et al., Desalination 2008, 218, 248-256). This study described perplexing results because even though the molecular weight cutoff was 220 g mol$^{-1}$, only 19% of tri-dodecylamine (molecular weight 522 g mol$^{-1}$) was retained (81% permeated the membrane). Also, when the system was studied using cross-flow, the rejection rate for all of the trialkylamines was much poorer than expected. The authors concluded that the use of a molecular weight cutoff for trialkylamines and the StarMem membranes was not useful and gave misleading predictions.

OSN membranes have an important role in the chemical industry, but they have two limitations that hinder applications in many commercial syntheses of small molecules. First, to be effective there must be a large difference between the molecular weight of the catalyst and the organic product. The molecular weights of many common ligands range from a couple to several hundred grams per mole and would not provide enough difference in molecular weight to separate them from products with similar or higher molecular weights. Second, the MWCO of a membrane is defined as the molecular weight at which 90 to 98% of the solute is rejected; thus, significant amounts of a molecule may pass through these membranes even if the molecular weight is larger than the cutoff.

Other membranes composed of nanopores etched in polycarbonate, zeolites, and metal-organic frameworks have been fabricated by others that can separate organic molecules. Zeolites are well known for distinguishing molecules based on size, but they are not used as membranes for molecules with the dimensions described in this proposal. Nanopores etched in polycarbonates have found some success, but the molecular size cutoffs are typically not sharp and the membranes suffer from low flux, fouling, and degradation with time (A. Asatekin and K. K. Gleason *Nano Lett.* 2011, 11, 677-686; K. B. Jirage, et al., *Science* 1997, 278, 655-658; C. R. Martin, et al., *J. Phys. Chem. B* 2005, 105, 1925-1934; and M. Wirtz, et al., *Chem. Rec.* 2002, 2, 112-117). Metal-organic frameworks have been developed that use porphyrins to define pores, but all of these examples require either water as the solvent or only separate gasses (J. T. Hupp, et al., *Langmuir* 2006, 22, 1804-1809; R. Q. Snurr, et al., *AIChE Journal* 2004, 50, 1090-1095, B. Chen, et al., *Acc. Chem. Res.* 2010, 43, 1115-1124; D.-H. Liu and C.-L. Zhong *J. Mater. Chem.* 2010, 20, 10308-10318; U. Mueller, et al., *J. Mater. Chem.* 2006, 16, 626-636; K. M. Thomas *Dalton Tran.* 2009, 1487-1505; D. Zhao, et al., *Acc. Chem. Res.* 2011, 44, 123-133; and R. Zou, et al., *CrystEngComm* 2010, 12, 1337-1353).

PDCPD synthesized from the polymerization of commercially available dicyclopentadiene and the Grubbs catalyst is a relatively new material (M. Perring and N. B. Bowden *Langmuir* 2008, 24, 10480-10487; J. K. Lee, et al., *J. Polym. Sci., Part B: Polym. Phys* 2007, 45, 1771-1780; L. M. Bellan, et al., *Macromol. Rap. Comm.* 2006, 27, 511-515; A. D. Martina, et al., *J. Appl. Polym. Sci.* 2005, 96, 407-415; and J. D. Rule and J. S. Moore *Macromolecules* 2002, 35, 7878-7882). This polymer is cross-linked and forms a solid, hard material that, when synthesized by other catalysts, is used in the fabrication of the hoods of semitrucks and snowmobiles.

SUMMARY OF THE INVENTION

Although PCPDCD is a hard polymer, it will readily swell in organic solvents and allow molecules to pass through it. Applicant has discovered a highly cross-linked PDCPD that can be used for liquid separations. It has been determined that molecules with a variety of polar functional groups and differing molecular weights permeate PDCPD membranes while other molecules do not. The difference in permeation is based on cross-sectional area of each molecule. Molecules that have cross-sectional areas larger than a critical value do not permeate the membranes while those below the critical value do permeate them (T. E. Balmer, et al., *Langmuir* 2005, 21, 622-632; M. R. Shah, et al., *J. Mem. Sci.* 2007, 287, 111-118; J. A. Cowen, et al., *Rev. Sci. Instr.* 2003, 74, 764-776; J. M. Watson, et al., *J. Mem. Sci.* 1992, 73, 55-71; S. Banerjee, et al., *J. Appl. Polym. Sci.* 1997, 65, 1789-1794; J. Du Pleiss, et al., *Eur. J. Pharm. Sci.* 2002, 15, 63-69; W. A. Philip, et al., *ACS Appl. Mater. Inter.* 2009, 1, 472-480; V. Sarveiya; J. F. Templeton and H. A. E. Benson *Eur. J. Pharm. Sci.* 2005, 26, 39-46; Y. Tamai, et al., *Macromolecules* 1994, 27, 4498-4508; Y. Tamai, et al., *Macromolecules* 1995, 28, 2544-2554; and J. Crank *The mathematics of diffusion*; Clarendon Press: Oxford, 1970).

Both polar and apolar molecules permeate if their cross-sectional area is below the critical value. This criterion for separation is based on the highly cross-linked matrix of PDCPD that results in a set of pores that allow the polymer to have unique properties for molecules with molecular weights between 100-600 g mol$^{-1}$.

The highly cross-linked PDCPD described herein are the first membranes to separate organic molecules with these molecular weights based on cross-sectional areas. Molecules with a cross-sectional area of 0.50 nm$^2$ or higher do not permeate the membranes and molecules with cross-sectional areas of 0.40 nm$^2$ do permeate them. Notably, many common ligands for metals have cross-sectional areas above 0.50 nm$^2$ and products of reactions with these ligands have cross-sectional areas 0.40 nm$^2$ or lower.

Accordingly, Applicant has discovered the first nanoporous membranes that separate many common ligands for metals from other molecules that possess molecular weights lower and higher than those of the ligands. The separation is due to the large cross-sectional area of ligands which hinders their diffusion through highly cross-linked PDCPD. In contrast to the ligands which do not permeate these membranes at any level, molecules with low to high molecular weights permeate them if their cross-sectional areas are below a critical threshold. Thus, the PDCPD materials of the invention retain key molecules that are common ligands for metals while allowing molecules with molecular weights over three times as high to permeate. Existing OSN membranes do not have this property for molecules with molecular weights of 100-600 g mol$^{-1}$.

In one embodiment the invention provides a method comprising, contacting a membrane comprising a highly cross-linked polydicyclopentyldiene matrix with a feed solution comprising a) a first component having a molecular weight in the range of from about 100 g mol$^{-1}$ to about 600 g mol$^{-1}$ and a cross-sectional area of less than about 0.40 nm$^2$ and b) a second component having a molecular weight in the range of from about 100 to about 600 g mol$^{-1}$ and a cross-sectional area of greater than about 0.50 nm$^2$ so that the feed solution is fractionated into a permeate comprising the first component and a retentate enriched in the second component.

In another embodiment the invention provides a method for preparing a highly cross-linked polydicyclopentdiene matrix comprising polymerizing cyclopentadiene in the presence of a catalyst to provide the highly cross-linked polydicyclopentdiene matrix.

In another embodiment the invention provides a method for preparing a highly cross-linked polydicyclopentdiene matrix comprising, contacting a starting cyclopentadiene matrix wherein the ratio of crosslinked double bonds to uncrosslinked double bonds is less than about 3:2 with an organic solvent under conditions which yield the highly cross-linked polydicyclopentdiene matrix wherein the ratio of crosslinked double bonds to uncrosslinked double bonds increases to at least about 3:2.

In another embodiment the invention provides a method for preparing a highly cross-linked polydicyclopentdiene matrix comprising, a) polymerizing cyclopentadiene in the presence of a catalyst to provide an intermediate polydicyclopentdiene matrix, and b) contacting the intermediate cyclopentadiene matrix with an organic solvent under conditions which yield the highly cross-linked polydicyclopentdiene matrix wherein the ratio of crosslinked double bonds to uncrosslinked double bonds increases to at least about 3:2.

In another embodiment the invention provides a method comprising contacting a membrane comprising a highly cross-linked polydicyclopentyldiene matrix of the invention with a feed solution comprising a) a first component having a molecular weight in the range of from about 100 to about 600 g mol$^{-1}$ and a cross-sectional area of less than about 0.40 nm$^2$ and b) a second component having a molecular weight in the range of from about 100 to about 600 g mol$^{-1}$ and a cross-sectional area of greater than about 0.50 nm$^2$ so that the feed solution is fractionated into a permeate comprising the first component and a retentate enriched in the second component.

In another embodiment the invention provides a highly cross-linked polydicyclopentdiene matrix prepared according to a method of the invention.

DETAILED DESCRIPTION

Figure 1:
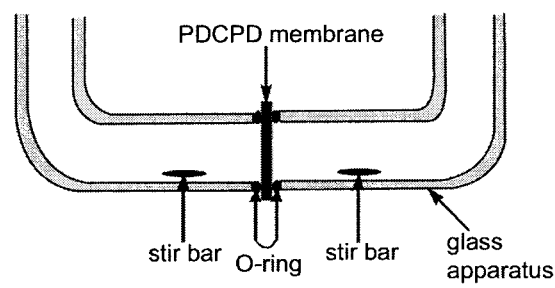
FIG. 1. Illustrates a cross-sectional schematic of an apparatus that can be used to measure permeation through PDCPD membranes.

As used herein, the term "membrane" means a semipermeable material which can be used to separate components of a feed fluid into a permeate that passes through the membrane and a retentate that is rejected or retained by the membrane.

As used herein, the term "matrix" means a regular, irregular and/or random arrangement of polymer molecules such that on a macromolecular scale the arrangements of molecules may show repeating patterns, or may show series of patterns that sometimes repeat and sometimes display irregularities, or may show no pattern. On a scale such as would be obtained from SEM, X-Ray or FTNMR, the molecular arrangement may show a physical configuration in three dimensions like those of networks, meshes, arrays, frameworks, scaffoldings, three dimensional nets or three dimensional entanglements of molecules. The matrix may be non-self supporting. Preferably, the matrix is in the form of a thin film with an average thickness from about 5 nm to about 10000 nm, and more preferably about 5 to about 400 nm. In usual practice, the matrix is grossly configured as an ultrathin film or sheet.

As used herein the term "highly crosslinked" as applied to a polydicyclopentyldiene matrix includes martices wherein the ratio of crosslinked double bonds to uncrosslinked double bonds is at least about 3:2. In one embodiment of the invention the ratio of crosslinked double bonds to uncrosslinked double bonds is at least about 7:3. In another embodiment of the invention the ratio of crosslinked double bonds to uncrosslinked double bonds is at least about 4:1.

In one embodiment the invention provides a composite membrane comprising a highly crosslinked polydicyclopentyldiene matrix on a porous support backing material. The porous support backing material can comprise a polymeric material containing pore sizes which are of sufficient size to permit the passage of permeate therethrough. Examples of porous support backing materials which may be used to prepare composite membranes of the invention include polymers such as polysulfones, polycarbonates, microporous polypropylenes, polyamides, polyimines, polyphenylene ethers, and various halogenated polymers such as polyvinylidine fluoride.

The membranes of the invention can be used to separate molecules having molecular weights in the range of from about 100 to about 600 g mol$^{-1}$. Molecules that can be separated include organic compounds, such as synthetic intermediates, pharmaceutical agents, catalysts, dyes, food additives, low molecular weight polymers (oligomers), some ligands for metals, and inorganic compounds such as those that bind to low molecular weight organic ligands or no organic ligands.

The feed solutions of the methods of the invention can comprise catalyst as components which are to be separated from other components in the feed solution. Such catalysts include palladium chloride, osmium dihydroxylation catalysts, acids, bases, hydrogenation catalysts (e.g. Wilkinson's catalyst), oxidation catalysts or reagents, nanocolloids of any one or combination of different elements, catalysts based on transition metals that spend part or all of their catalytic cycle in the homogeneous phase, catalysts based on copper or other metals that catalyze enantioselective Diels-Alder reactions or aldol reactions, catalysts based on Pd that are applied in Buchwald-Hartwig or Suzuki or Sonogashira or other coupling reaction. Additionally, the ligands to many metals can be considered a component of a catalyst.

The feed solutions can comprises a broad range of polar and non-polar solvents. For example, suitable solvents include paraffins (e.g. n-pentane, n-hexane, hexanes, n-heptane, cyclopentane, cyclohexane, methylcyclopentane, and naphtha), isopars, halogenated hydrocarbons (e.g. chloroform, methylene chloride, carbontetrachloride, and the Freon class of halogenated solvents), ethers (e.g., tetrahydrofuran and di(C1-C6)alkylethers), water, other ionic liquids (e.g. 1-butyl-3-methylimidazolium hexafluorophosphate), and other polar solvents. In one embodiment of the invention the feed solution comprises an aprotic organic solvent. In one embodiment of the invention the feed solution comprises a protic organic solvent. In one embodiment of the invention the feed solution comprises water. In one embodiment of the invention the feed solution comprises methylene chloride, toluene, tetrahydrofuran, methanol, ethyl acetate, chloroform, benzene, DMF, DMSO, or other organic solvent.

In one embodiment the invention provides a method for preparing a highly cross-linked polydicyclopentdiene matrix comprising polymerizing cyclopentadiene in the presence of a catalyst. Suitable catalysts include Grubb's catalyst. In one embodiment of the invention the monomer to Grubb's catalyst ratio is at least about 4000. In another embodiment the monomer to Grubb's catalyst ratio is at less than about 50,000.

In one embodiment the invention provides a method for preparing a highly cross-linked polydicyclopentdiene matrix comprising, contacting a starting cyclopentadiene matrix wherein the ratio of crosslinked double bonds to uncrosslinked double bonds is less than about 3:2 with an organic solvent under conditions which yield the highly cross-linked polydicyclopentdiene matrix. Any suitable organic solvent can be used. For example, suitable solvents may include aprotic organic solvents (e.g. benzene, toluene, methylene chloride, chloroform, carbontetrachloride, tetrahydrofuran, pentane, or hexanes, or a mixture thereof). In one embodiment the solvent comprises toluene or methylene chloride, or a mixture thereof.

The invention will now be illustrated by the following non-limiting Examples.

EXPERIMENTAL

Characterization and Measurements $^1$H NMR spectra were acquired on a Bruker DPZ-300 NMR at 300 MHz or a Bruker DRX-400 NMR at 400 MHz and referenced to TMS. The concentration of Co(salen) was acquired on a Varian Cary 100 Scan UV-Visible spectrophotometer and Varian 720-ES ICP-OES (inductively coupled plasma-optical emission spectrometer). The thicknesses of the membranes were determined using a Micromaster microscope at the highest magnification. Infrared spectra were acquired on a Bruker Tensor 27. A room temperature DTGS (deuterated triglycine sulfate) detector was used. All chemicals were purchased at their highest purity from Aldrich or Acros and used as received.

Calibration of UV-VIS Spectrophotometer.

$Co^{II}$(salen) (23 mg, 0.039 mmol) was dissolved in toluene (0.5 mL) prior to the addition acetic acid (0.01 mL, 0.18 mmol). The mixture was stirred at room temperature for 1 h to yield $Co^{III}$(salen) with an acetate counterion. Here $Co^{III}$(salen)OAc is referred to as Co(salen) for the rest of this report. Toluene and the excess acetic acid were removed under vacuum. The Co(salen) was dissolved in $CH_2Cl_2$ (10 mL) and stirred at room temperature for 24 h. The solvent was removed and Co(salen) was redissolved in $CH_2Cl_2$ (10 mL) to yield a 0.00386 M solution. This solution was diluted to make standard solutions to calibrate the instrument. The intensity of the peak at 410 nm in each of the spectra was measured and plotted against concentration to create a calibration curve.

Calibration of ICP-OES.

Standards for Co were made by diluting a standard solution containing 9908 ppm of Co in 1-2 wt. % of $HNO_3$ with water. The concentrations of the standards were 0.248 ppm, 0.495 ppm 0.990 ppm, 1.99 ppm, 4.95 ppm, 7.93 ppm, 15.8 ppm, and 39.6 ppm. The standards were used to calibrate the ICP-OES before running the samples for Table 2. A 1 ppm solution of was Y used as an internal standard.

Optical Spectroscopy.

The thickness of a membrane was determined by cutting a section of a membrane and placing it under the microscope. The section of membrane was held vertically with tweezers and the edge was imaged at the highest magnification. An optical micrograph was taken and the thickness was measured.

Synthesis of PDCPD Membranes at a 5,000:1 Dicyclopentadiene:Grubbs Catalyst Ratio.

A 20 mg/mL solution of Grubbs first generation catalyst was made using 1,2-dichloroethane. A sample of this solution (0.246 mL, $6.0 \times 10^{-3}$ mmol of catalyst) was added to 4 mL of dicyclopentadiene heated to 40° C. to melt it. The melting point of dicyclopentadiene is 33° C. This solution was immediately placed between two glass slides with 100 µm thick paper as spacers along the edges. The sample was heated to 50° C. for 2 h and then removed from the glass slides.

Synthesis of PDMS Membrane.

These membranes were fabricated similar to methods described in prior work. Sylgard 184 was mixed with a curing agent in a 10:1 ratio and degassed. The PDMS was poured over a flat glass slide while allowing any excess to flow over the side. The glass had been coated with a monolayer of trichloro(1H,1H,2H,2H-perfluorooctyl)silane prior to its use. The PDMS was cured in a 65° C. oven for 24 h. The PDMS membrane was delaminated from the glass side by swelling in dichloromethane.

Permeation of Co(salen) Through PDCPD Membranes (Table 2).

Co(salen) was synthesized with acetic acid and toluene as described before. A PDCPD membrane was added to the glass apparatus to study permeation. $CH_2Cl_2$ (25 mL) was added to the downstream side of the membrane. $CH_2Cl_2$ (25 mL) with Co(salen) (0.038 mmol) was added to the upstream side of the membrane. Both sides of the membrane were stirred continuously at room temperature. Aliquots (4 mL) were removed from both sides of the membrane at 24 and 48 h.

The concentration of Co(salen) was determined by UV-Vis spectroscopy or ICP-OES using the calibration curves that were determined as previously described. Samples for ICP-OES were prepared by first drying each aliquot and burning off all the organic materials with a Bunsen burner. The Co was dissolved in 1 mL of a 3:1 solution of concentrated HCl and concentrated $HNO_3$. The aliquot from upstream side of the membrane was diluted with 10 mL of water. The aliquot from the downstream side of the membrane was diluted with 5 mL of water. The samples were run through ICP-OES after it was calibrated on the same day as the measurements.

Permeation of Co(salen) Through PDCPD Membranes Treated with Ethyl Vinyl Ether (Table 2 entries 6-8).

Co(salen) was synthesized with acetic acid and toluene as described before. $CH_2Cl_2$ (25 mL) and ethyl vinyl ether (5 mL, 52 mmol) were added to the downstream side of the membrane and $CH_2Cl_2$ (25 mL) and ethyl vinyl ether (5 mL, 52 mmol) with Co(salen) (0.038 mmol) were added to the upstream side of the membrane. Both sides of the membrane were stirred continuously at room temperature. At 24 and 48 h aliquots (4 mL) of solvent were removed from both sides of the membrane. The aliquots were used to determine the concentration of Co(salen) by UV-Vis spectroscopy as previously described.

Permeation of Co(salen) Through a PDMS Membrane (Table 1).

Co(salen) was synthesized with acetic acid and toluene. A PDMS membrane was added to the apparatus to study permeation. $CH_2Cl_2$ (25 mL) was added to the downstream side of the membrane. $CH_2Cl_2$ (25 mL) with Co(salen) (0.038 mmol) were added to the upstream side of the membrane. Both sides of the membrane were stirred continuously at room temperature. At 2, 4, and 6 h aliquots (4 mL) were removed from both sides of the membrane. The aliquots were used to determine the concentration of Co(salen) by UV-Vis spectroscopy as previously described.

Swelling of PDCPD by Various Solvents (Table 3).

Commercially available dicyclopentadiene (24 mL, 0.177 mol) was heated in a glass vial at 35° C. for 10 minutes to melt it. The Grubbs catalyst (15 mg, 0.017 mmol) was mixed with dichloromethane (0.5 mL), added to the dicyclopentadiene, and thoroughly mixed. The solution was heated in a water bath at 50° C. for 1.5 h. The slab of PDCPD was removed from the vial and swelled in dichloromethane mixed with ethyl vinyl ether. The slab of PDCPD was cut into 12 small cubes. All the cubes were dried in air and then under vacuum.

The weights of cubes of PDCPD were measured. Each cube was placed in a glass vial with 10 mL of solvent to completely immerse the cube for 24 h. Next, the cubes were removed from the vials and briefly wiped with kimwipes to remove solvent from their surfaces. The weights of the swollen PDCPD cubes were measured. The swollen weight was divided by the dry weight of PDCPD to calculate how well each solvent swells PDCPD.

Permeation of Organic Molecules Through PDCPD Membranes with Different Solvents (Tables 4 and 5).

A membrane—made with a monomer:catalyst loading of 5000:1—was added to the apparatus to study permeation.

CH$_2$Cl$_2$, toluene, or THF (25 mL) was added to the downstream side of the membrane and 25 mL of the same solvent was added to the upstream side of the membrane with 3 mmol of the substrate and 1 mmol hexadecane as an internal standard. Both sides of the membrane were stirred continuously at room temperature. At 24 and 48 h a 1 mL aliquot was removed from both sides. The aliquot was used to determine the concentration of the substrate and hexadecane by $^1$H NMR spectroscopy. The concentrations were found by the addition of known amounts of tetraethylene glycol to each aliquot and comparing the known concentration of tetraethylene glycol with the concentration of the molecule of interest.

Rate of Flux of Hexadecane Through a 5000/1 PDCPD Membrane.

A membrane—made with a monomer:catalyst loading of 5000:1—was added to the apparatus to study permeation. CH$_2$Cl$_2$ (20 mL) was added to the upstream and downstream sides of the membrane. The membrane was allowed to equilibrate for 30 min. CH$_2$Cl$_2$ (5 mL) was added to the downstream side of the membrane and CH$_2$Cl$_2$ (5 mL) was added to the upstream side of the membrane with hexadecane (1 mmol). Both sides of the membrane were stirred continuously at room temperature. At 1, 2, and 3 h a 1 mL aliquot was removed from both sides. An $^1$H NMR spectrum was taken of each aliquot using tetraethylene glycol as an internal standard as described previously.

Flux is the amount of material in moles that progress through a unit area of a membrane per unit time. The mmole of hexadecane on the downstream side as determined by $^1$H NMR spectroscopy was plotted against time. The slope of the graph was divided by the area of the membrane (7.07 cm$^2$) resulting in the flux of hexadecane. The aliquots were obtained early when flux can be approximated as unidirectional.

Density of Cross-Links of PDCPD Membranes.

IR spectroscopy was used to determine the density of cross-links in PDCPD. Dicyclopentadiene (5%, 10%, 15% and 20% by volume solutions) in dioxane was used to find a calibration curve. The IR spectrum of each solution was measured using a cell with a fixed pathlength of 100 μm. The intensity of the peak at 704 cm$^{-1}$ in each of the IR spectra was measured and plotted against concentration to yield the calibration curve.

A 20 mg/mL solution of the Grubbs first generation catalyst in 1,2-dichloroethane was made. Commercially available dicyclopentadiene (4 mL, 0.029 mmol) was heated to 40° C. The catalyst solution (0.246 mL, 6.0×10$^{-3}$ mmol of catalyst) was added to dicyclopentadiene. A sample of this solution was added to the top of a glass slide and was pressed by down by another glass slide. This set up was heated to 50° C. for 2 h. The glass slides were removed from the PDCPD membranes and the thicknesses were measured using an optical microscope as described previously.

Eleven PDCPD membranes were fabricated and the IR spectrum of each was obtained. The intensity of the peak at 704 cm$^{-1}$ for each of the membranes was fitted to the calibration curve and the density of unreacted cyclic olefin in PDCPD was calculated. The membranes were immersed in methylene chloride in glass vials for an hour. The dichloromethane was decanted off and any remaining solvent in the membrane was removed in vacuo for 12 h. The IR spectra were measured for all of the membranes. The intensity of the peak at 704 cm$^{-1}$ for each of these membranes was fitted to the calibration curve and the density of unreacted cyclic olefin in PDCPD was calculated.

Isolation of Cholesterol from Tricyclohexylphosphine, Triphenylphosphine, and Tributylamine.

A membrane—made with a monomer:catalyst loading of 5000:1—was added to the apparatus to study permeation. CH$_2$Cl$_2$ (23 mL) was added to the downstream side of the membrane and CH$_2$Cl$_2$ (25 mL) was added to the upstream side of the membrane with cholesterol (3 mmol), tricyclohexylphosphine (2 mmol), triphenylphosphine (2 mmol), and tributylamine (3 mmol). The solutions on the downstream and upstream sides of the membranes were continuously stirred. A 2 mL aliquot was removed from the upstream side immediately after it was added to the apparatus. The solvent was removed and a $^1$H NMR spectrum was obtained. At 48 h aliquots (5 mL) were removed from both sides of the membrane. The solvent was removed and $^1$H NMR spectra were obtained.

Isolation of Nitrobenzaldehyde from Binol.

A membrane—made with a monomer:catalyst loading of 5000:1—was added to the apparatus to study permeation. CH$_2$Cl$_2$ (50 mL) was added to the downstream side of the membrane and CH$_2$Cl$_2$ (25 mL) was added to the upstream side of the membrane with binol (0.264 g) and nitrobenzaldehyde (0.484 g). The solvent on both sides of the membrane was stirred continuously at room temperature. At 24 h the solvent from the downstream side was removed and evaporated to recover nitrobenzaldehyde (0.249 g). The solvent was replaced with CH$_2$Cl$_2$ (50 mL). At 48 h the solvent was removed from the downstream side and evaporated recover nitrobenzaldehyde (0.186 g). Also at 48 h, the solvent from the upstream side was removed and evaporated to recover nitrobenzaldehyde (50 mg) and binol (0.046 g). CH$_2$Cl$_2$ (25 mL) was added the upstream side and stirred for 24 h. The solvent was removed and evaporated to yield 0.103 g of binol. The membrane was removed from the apparatus, cut into pieces, and placed into a flask with CH$_2$Cl$_2$ (50 mL) for 24 h. The CH$_2$Cl$_2$ was evaporated to yield an additional 0.033 g of binol. The total recovery of nitrobenzaldehyde from solvent downstream of the membrane was 90% with <3% binol contamination. The total recovery of binol from solvent upstream of the membrane was 69%.

Recycling of a PDCPD Membrane.

A PDCPD membrane was added to the apparatus to study permeation. CH$_2$Cl$_2$ (50 mL) was added to the downstream side of the membrane and CH$_2$Cl$_2$ (15 mL) was added to the upstream side of the membrane with binol (0.286 g, 1 mmol) and nitrobenzaldehyde (0.151 g, 1 mmol). At 24 and 48 h the solvent from the downstream side was removed and evaporated to recover nitrobenzaldehyde. The solvent was replaced with fresh CH$_2$Cl$_2$ (50 mL). At 72 h the solvent on the upstream and downstream sides of the membrane were remove and evaporated to recover binol and nitrobenzaldehyde. Fresh CH$_2$Cl$_2$ (30 mL) was added upstream of the membrane to extract binol from the membrane. At 84 h solvent upstream of the membrane was removed and evaporated to recover binol. This completed cycle 1 and cycles 2 and 3 were completed with the same PDCPD membrane. In cycle 1 99% of the nitrobenzaldehyde and 40% of the binol were recovered, in cycle 2 79% of the nitrobenzaldehyde and 4% of the binol were recovered, and in cycle 3 72% of the nitrobenzaldehyde and 82% of the binol were recovered.

Measurement of the Critical Dimension and Critical Area.

The software used for these measurements was Spartan '08 V1.2.0. Each molecule was drawn in the software using a ball and spoke representation and its energy was minimized by finding the equilibrium geometry at ground state with a semi-empirical method using AM1 parameters. The surface area and molecular volume were calculated based on a space filling model. The space filling model chosen was a 3D molecular model with atoms represented by spheres whose radius is assumed to be the Van der Waals radius determined by the electron density cut-off at 0.002 electrons/Å$^3$.

Each molecule was analyzed to find the conformation with the lowest rectangular, cross-sectional area. The two dimensions of the rectangle were measured and the longer dimension was labeled the critical dimension and the area was labeled as the critical area.

Results and Discussion

Fabrication of PDCPD Membranes and the Apparatus to Measure Permeation.

Membranes composed of PDCPD were readily fabricated by the polymerization of commercially available dicyclopentadiene using the Grubbs first generation catalyst at molar ratios of >4,000:1 dicyclopentadiene:Grubbs catalyst. The Grubbs catalyst was added to dicyclopentadiene, mixed thoroughly, and placed between two glass slides separated by approximately 100 microns. These membranes were robust and could be manipulated by hand.

In the experiments described in this report, the membranes were placed in an apparatus between two reservoirs of solvent. The membranes were kept in place using O-rings on either side and held in place using a clamp. The solvent on either side of the membrane was agitated using stir bars and a magnetic stir plate to eliminate any boundary effects that might influence these experiments. In most experiments the permeation of a molecule through the membrane was studied by adding it to solvent on only one side of the membrane. This was called the "upstream" side of the membrane. Many molecules permeated through the membranes and were also found in the solvent "downstream" of the membrane.

Permeation of Co(salen) Using Membranes Composed of PDCPD or Polydimethylsiloxane.

Preliminary work indicated that membranes composed of PDCPD would not allow molecules above a critical cross-sectional area to permeate. To investigate the composition of PDCPD membranes that would retain selected molecules based on their cross-sectional area, the permeation of Co(salen) was studied due to its large cross-sectional area of 1.15 nm$^2$. To contrast the results with PDCPD membranes, the permeation of Co(salen) and hexadecane through membranes composed of polydimethylsiloxane (PDMS) were also studied. PDMS was chosen based on our prior work to site-isolate water, Grignard reagents, butyl lithium, PdCl$_2$, and other catalysts and reagents.[20,21] In this prior work, PDMS successfully retained a wide variety of reagents and catalysts based on their low solubility in hydrophobic PDMS.

A membrane composed of PDMS was fabricated with a thickness of 450 microns and equilibrated with CH$_2$Cl$_2$ on both sides of the membrane. Co(salen) and hexadecane were added upstream of the membrane and the concentration of Co(salen) and hexadecane upstream ($S_u$) and downstream ($S_d$) of the membrane were measured at 2, 4, and 6 h (Table 1). In prior work little evidence was observed for the ability of PDMS membranes to distinguish molecules based on their cross-sectional areas, and in experiments with Co(salen) and hexadecane, both molecules permeated the membranes at similar rates.

TABLE 1

Permeation of Co(salen) and hexadecane using PDMS membranes and CH$_2$Cl$_2$ as the solvent.

| Molecule | $S_d/S_u$ at 2 h | $S_d/S_u$ at 4 h | $S_d/S_u$ at 6 h |
|---|---|---|---|
| Co(salen) | 0.03 | 0.07 | 0.13 |
| hexadecane | 0.17 | 0.52 | 0.61 |

PDCPD membranes were fabricated with different loadings of dicyclopentadiene:Grubbs catalyst as shown in Table 2 to determine the ratio that led to retention of Co(salen). In all of these experiments the concentration of Co(salen) was studied by UV-VIS spectroscopy rather than $^1$H NMR spectroscopy because the UV-VIS spectrometer allowed lower concentrations of Co(salen) to be measured and because Co(salen) was paramagnetic. At high loadings of 50,000:1 dicyclopentadiene:Grubbs catalyst the polymerization was incomplete and the polymer membrane was tacky and not robust. At loadings of dicyclopentadiene:Grubbs catalyst below 4,000:1 the polymerization was too rapid and the solution hardened before it could be cast into a thin film.

TABLE 2

Permeation of Co(salen) using PDCPD membranes fabricated with different catalyst loadings.

| Entry | Dicyclopentadiene: Grubbs catalyst | Ethyl vinyl ether | $^a$Thickness (μm) | $^bS_d/S_u$ at 24 h | $^bS_d/S_u$ at 48 h |
|---|---|---|---|---|---|
| 1 | $^c$50000/1 | $^d$none | Na | Na | Na |
| 2 | 20000/1 | none | 110 | ≤0.004$^e$ | ≤0.005$^e$ |
| 3 | 10000/1 | none | 110 | ≤0.005$^e$ | ≤0.006$^e$ |
| 4 | 5000/1 | none | 110 | ≤0.006$^e$ | ≤0.007$^e$ |
| 5 | 4000/1 | none | 100 | ≤0.005$^e$ | ≤0.007$^e$ |
| 6 | 10000/1 | $^f$10 mL | 120 | 0.49 | 0.35 |
| 7 | 5000/1 | $^f$10 mL | 88 | 0.05 | 0.06 |
| 8 | 4000/1 | $^f$10 mL | 110 | 0.04 | 0.08 |
| 9 | 5000/1 | $^g$none | 98 | ≤0.006$^e$ | ≤0.009$^e$ |

$^a$The thickness of the membrane.
$^b$The ratio of the downstream ($S_d$) concentration of Co(salen) to the upstream ($S_u$) concentration.
$^c$Incomplete polymerization after 47 h at 50° C.
$^d$No ethyl vinyl ether was added to the solvent on either side of the membrane.
$^e$No Co(salen) was detected in the solvent downstream of the membrane.
$^f$Ethyl vinyl ether was added to the solvent on each side of the membrane.
$^g$THF was added to the solvent on either side of the membrane in the same concentration as ethyl vinyl ether from entries 6-8.

PDCPD membranes synthesized with molar ratios of 4,000 to 20,000 dicyclopentadiene to one Grubbs catalyst resulted in controlled polymerizations and well-defined membranes. These membranes were used to study whether Co(salen) permeated them using CH$_2$Cl$_2$ as the solvent. In each of these experiments Co(salen) was not detected by UV-VIS spectroscopy downstream of the membrane at 24 or 48 h (Table 2). To provide further evidence for the retention of Co(salen), the concentration of Co downstream and upstream of the membranes were measured by ICP-OES at 48 h for entries 4 and 5. In these experiments, <0.5% of the Co was found downstream of the membrane which demonstrated that it did not permeate.

In entries 2-5 in Table 2 less than 30% of the Co(salen) permeated into the PDCPD matrix after 48 h, the remainder was found in the solvent upstream of the membrane. Thus, the Co(salen) was soluble in the PDCPD membrane and readily partitioned into it, so its slow permeation through the membrane was due to a very low rate of diffusion in the PDCPD matrix. In a later section it will be shown that molecules can be extracted from the PDCPD membrane and do not remain "trapped" in the PDCPD matrix.

These membranes were further studied for the effect of ethyl vinyl ether on the permeation of Co(salen). When dicyclopentadiene is polymerized with the Grubbs catalyst, the strained bicylic olefin reacts rapidly to yield a polymer and the other olefin reacts at a slower rate to yield cross-links in the PDCPD matrix. We hypothesized that the membranes underwent further cross-linking when swollen in organic solvent prior to being used as membranes because they were fabricated in the absence of solvent and initially yielded hard, solid materials that hindered the diffusion of the Grubbs catalyst. To investigate whether the Grubbs catalyst reacted when the membranes were swollen in organic solvents, they were swollen in $CH_2Cl_2$ with ethyl vinyl ether to terminate the Grubbs catalyst. If the Grubbs catalyst was inactive when the membranes were swollen in $CH_2Cl_2$, membranes treated with ethyl vinyl ether would have similar properties for the permeation of Co(salen) as those not exposed to ethyl vinyl ether. If the Grubbs catalyst was dormant in the solid PDCPD and further cross-linked PDCPD when swollen in $CH_2Cl_2$, the addition of ethyl vinyl ether would stop any further cross-linking and affect the permeation of Co(salen). When these membranes were studied for their ability to resist the permeation of Co(salen), all of them allowed Co(salen) to permeate (entries 6-8 in Table 2). In a control experiment to study whether the addition of ethyl vinyl ether resulted in different permeation rates due to a change in solvent polarity, THF was added to $CH_2Cl_2$ rather than ethyl vinyl ether (entry 9 in Table 2). In this experiment Co(salen) did not permeate the membrane which demonstrated that the effect of ethyl vinyl ether could not be explained by a change in solvent polarity.

These experiments provided evidence that the cross-linking of the PDCPD matrix is incomplete when a solid polymer matrix is formed and the membranes must be swollen in organic solvents to have the desired properties to retain Co(salen). In the next section of this report, the density of cross-links in PDCPD before and after swelling in $CH_2Cl_2$ will be reported that provide further evidence that the Grubbs catalyst is dormant in PDCPD and reacts to form more cross-links when the polymer is swollen in organic solvents.

Measurement of Density of Cross-Links in PDCPD.

The density of cross-links in PDCP was measured using IR spectroscopy. It important to understand that when dicyclopentadiene is polymerized it yields a hard, solid material that lacks well-defined, empty pores such as those found for zeolites or other nanoporous membranes. PDCPD was studied by scanning electron microscopy to reveal a flat, featureless surface. The surface of PDCPD was investigated by x-ray photoelectron spectroscopy and grazing angle total reflection-infrared (GATR-IR) spectroscopy in prior work. The surface of PDCPD had little surface oxidation and its GATR-IR spectrum did not possess any unexplained peaks. Typical methods to characterize the distribution of empty pores were not attempted because of the lack of empty pores within PDCPD.

Figure 2:
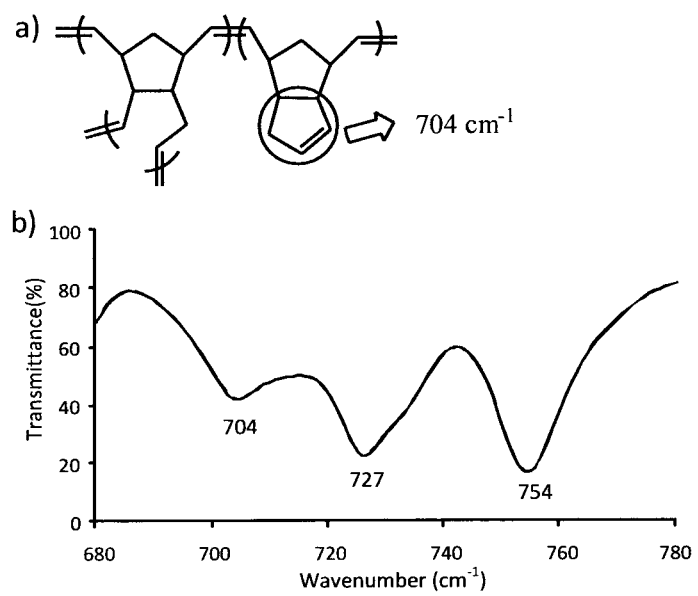
FIG. 2. Illustrates, a) The unreacted five membered ring of cyclopentadiene that is responsible for the infrared absorption peak at 704 cm$^{-1}$ and b) The infrared spectrum of PDCPD in a region of interest.

The most important characteristic of PDCPD is the density of cross-links within the matrix that occur when the five membered ring in the monomer reacts with another polymer chain. The degree of cross-linking of PDCPD was measured using IR spectroscopy by investigating the peak at $704\ cm^{-1}$ that was assigned to the cis oops bending of the unreacted olefin in PDCPD (FIG. 2). Opening of this ring by the Grubbs catalyst led to cross-links in PDCPD; thus, measurement of the concentration of the unreacted cyclic olefin in a PDCPD matrix gave an approximate concentration of cross-links. The peak at $704\ cm^{-1}$ was assigned to the cis oops of the unreacted olefin based on literature precedent for peaks in this area. Olefins that reacted with the Grubbs catalyst were no longer part of medium sized rings and their values for the oops peak appeared at higher wavenumbers based on analogy to linear molecules. For instance, the oops peak for cis-3 heptene was at $714\ cm^{-1}$ and for cyclopentene it was at $697\ cm^{-1}$. Trans oops peak typically have values above $720\ cm^{-1}$. Thus, the peak at $704\ cm^{-1}$ was used to find the concentration of uncross-linked monomer in PDCPD.

A calibration curve for the cis oops peak was obtained by measuring the intensity of the peak for dicyclopentadiene dissolved in dioxane. Dioxane was chosen due to its low dielectric constant and absence of peaks in the area of interest. Briefly, an IR flow cell with 100 micron spacings between the plates was filled with solutions of dicyclopentadiene in dioxane. The IR spectra were obtained for different concentrations and a calibration curve was measured.

Eleven PDCPD membranes were fabricated with molar ratios of dicyclopentadiene to Grubbs catalyst of 5,000:1 and their IR spectra were measured. Next, the membranes were swelled in $CH_2Cl_2$ for an hour, dried under $N_2$, and the solvent was completely removed by placing the membranes under vacuum for 12 h. The IR spectra were again measured for the membranes. The average density of unreacted cyclic olefin as shown by the peak at $704\ cm^{-1}$ was only 47% (±19%) before swelling in $CH_2Cl_2$. Thus, approximately 53% (±19%) of the cyclic olefins had reacted to form cross-links. From the prior experiments with Co(salen) and PDCPD membranes that had been exposed to ethyl vinyl ether (Table 2), it was known that the Grubbs catalyst was reactive and would further cross-link the membranes when swollen in organic solvent. This conclusion was supported by the IR spectrum of the membranes after swelling in $CH_2Cl_2$ which showed that approximately 84% (±12%) of the cyclic olefins had reacted. Clearly, the Grubbs catalyst was able to react further when the hard, solid PDCPD membranes were swollen in $CH_2Cl_2$ for an hour. This result is understandable because of the stability of the Grubbs catalyst in air (particularly when it is embedded in a solid matrix), and the extent that the PDCPD membranes swell in $CH_2Cl_2$.

Flux of Organic Molecules Through PDCPD Membranes

PDCPD is significantly swollen by organic solvents (Table 3). To quantify the ability of solvents to swell PDCPD a series of dry slabs of PDCPD were weighed, immersed in a solvent for 24 h, removed from the solvent, briefly dried of any solvent on the exterior of the slab, and weighed. The data in Table 3 demonstrated that apolar solvents swelled PDCPD the best which was reasonable considering apolar structure of PDCPD. In addition, PDCPD adsorbed more than its weight in selected solvents.

TABLE 3

How solvents swell PDCPD.

| Solvent | Weight of swollen PDCPD/weight of PDCPD (g/g) |
|---|---|
| chloroform | 3.38 |
| dichloromethane | 2.46 |
| toluene | 2.23 |
| tetrahydrofuran | 2.06 |
| ethyl acetate | 1.35 |
| diethyl ether | 1.34 |
| hexanes | 1.32 |
| petroleum ether | 1.27 |
| dioxane | 1.26 |
| acetone | 1.14 |
| methanol | 1.12 |

Figure 3:
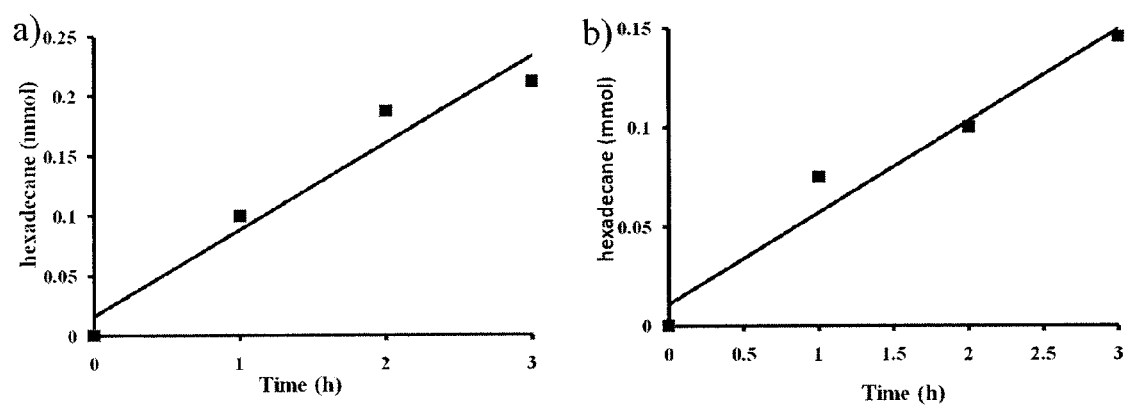
FIG. 3. Is a graphic representation of the amount of hexadecane (in mmol) that was downstream of a membrane as a function of time. The solvent was a) CH$_2$Cl$_2$ and b) toluene.

The flux of hexadecane through PDCPD membranes was quantified with $CH_2Cl_2$ and toluene as the solvents. The membranes were fabricated as before with a molar ratio of 5,000:1 dicyclopentadiene to Grubbs catalyst. The membranes were placed into the apparatus to measure flux and were equilibrated for 30 min with solvent on both sides. After this time period, 1 mmol of hexadecane was added to solvent on one side of the membrane (the upstream side) and aliquots upstream and downstream of the membranes were periodically removed to quantify the concentration of hexadecane. In FIG. 3 the amount of hexadecane—measured in mmoles—downstream of the membranes as a function of time is shown. The values for the flux of hexadecane were calculated to be $1.02\times10^{-5}$ mol cm$^{-2}$ h$^{-1}$ with $CH_2Cl_2$ as solvent and $6.53\times10^{-6}$ mol cm$^{-2}$ h$^{-1}$ with toluene as solvent. Although these values are lower than those reported for other membranes, such as the OSN membranes used in the chemical industry, the PDCPD membranes were not optimized for their flux. The flux can be increased by using thinner membranes and by applying external pressure.

For comparison, the upper limit for the flux of Co(salen) in entry 4 of Table 2 with $CH_2Cl_2$ as the solvent was approximately $4\times10^{-10}$ mol cm$^{-2}$ h$^{-1}$. Thus, the difference for flux of hexadecane and Co(salen) was at least four to five orders of magnitude.

The ability of hexadecane, nitrobenzaldehyde, cholesterol, hexanoic acid, and 1,6-diaminohexane to permeate PDCPD membranes with $CH_2Cl_2$, toluene, and THF as solvents was studied. In these experiments, each of the molecules and hexadecane were added to solvent on one side of the membrane and the concentrations upstream and downstream were found after 24 and 48 h (Table 4). Hexadecane was added as an internal control to ensure that each membrane had similar properties and that permeation was measured consistently. Each of these molecules had reasonable rates of permeation through the membranes and, except for cholesterol, the concentrations on either side of the membrane had mostly equilibrated at 48 h.

TABLE 4

Flux of five organic molecules through PDCPD membranes

| Molecule | Solvent | [a]Thickness (μm) | [b]$S_d/S_u$ at 24 h | [b]$S_d/S_u$ at 48 h |
|---|---|---|---|---|
| hexadecane | $CH_2Cl_2$ | 100 | 0.68 | 0.95 |
| hexadecane | Toluene | 110 | 0.82 | 0.86 |
| hexadecane | THF | 100 | 0.66 | 0.98 |
| nitrobenzaldehyde | $CH_2Cl_2$ | 100 | 0.82 | 1.0 |
| nitrobenzaldehyde | Toluene | 110 | 0.96 | 0.98 |
| nitrobenzaldehyde | THF | 100 | 0.66 | 1.0 |
| cholesterol | $CH_2Cl_2$ | 100 | 0.44 | 0.69 |
| cholesterol | Toluene | 110 | 0.54 | 0.58 |
| cholesterol | THF | 100 | 0.54 | 0.82 |
| hexanoic acid | $CH_2Cl_2$ | 99 | 0.88 | 0.94 |
| hexanoic acid | Toluene | 110 | 0.55 | 0.82 |
| hexanoic acid | THF | 89 | 0.69 | 1.0 |
| 1,6-diaminohexane | $CH_2Cl_2$ | 80 | 0.81 | 0.93 |
| 1,6-diaminohexane | Toluene | 98 | 0.95 | 0.97 |
| 1,6-diaminohexane | THF | 120 | 1.0 | 1.0 |

[a]The thickness of the PDCPD membrane that was prepared at a molar ratio of dicyclopentadiene:Grubbs catalyst of 5,000:1.
[b]The ratio of the concentration downstream to the concentration upstream for each molecule.

The permeation of a molecule through a membrane is dependent on the rate of diffusion of that molecule within a membrane multiplied by its solubility in the membrane according to the well known equation P=DS. Each of the five molecules shown in Table 4 permeated the membranes at appreciable rates which demonstrated that they were soluble and possessed reasonable rates of diffusion within the PDCPD matrix. What is notable is that both polar and apolar molecules permeated at similar rates through the hydrophobic, but swollen, PDCPD membranes.

Figure 4:
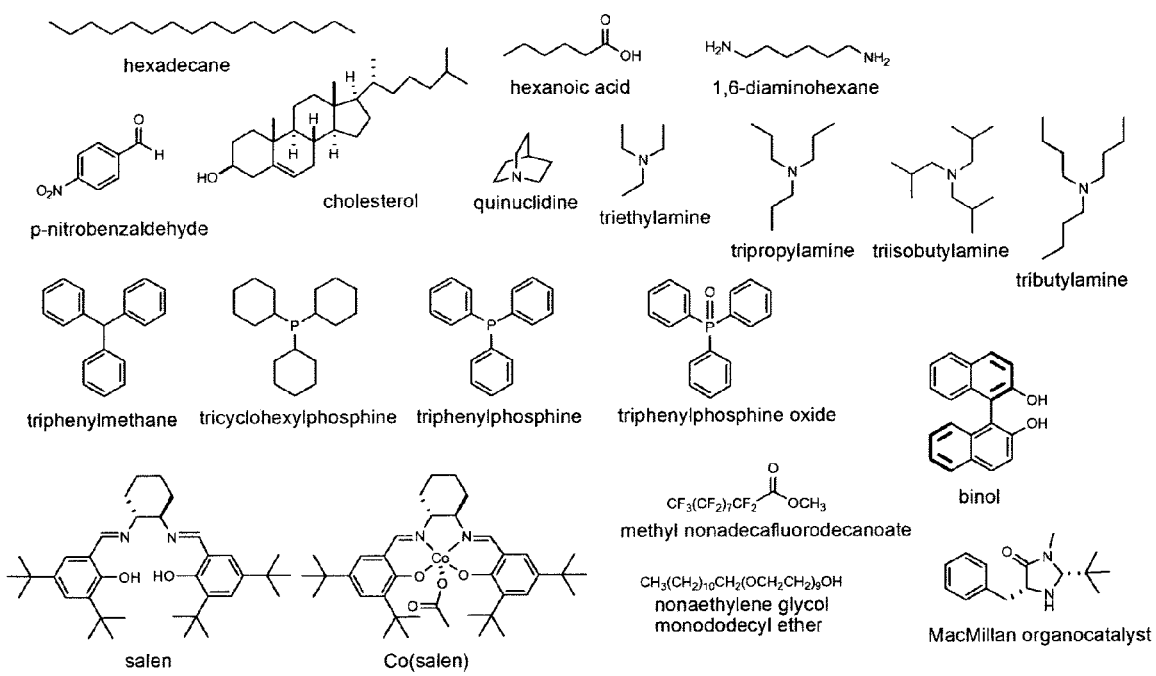
FIG. 4. Shows the molecules that were studied for their permeation through PDCPD membranes hereinbelow.

The ability of 14 additional molecules to permeate PDCPD membranes fabricated from a dicyclopentadiene to Grubbs catalyst ratio of 5,000:1 were measured with $CH_2Cl_2$ as the solvent (FIG. 4 and Table 5). Similar to other experiments, the molecule of interest and hexadecane were added to solvent upstream of the membranes. The internal control of adding hexadecane to each experiment ensured that the flux was similar for each membrane and that a lack of flux of a molecule through the membrane was not due to a faulty membrane, but rather it was due to an intrinsic property of the membrane.

TABLE 5

Permeation of organic molecules using PDCPD membranes and $CH_2Cl_2$ as the solvent.

| Molecule | Molecular weight (g mol$^{-1}$) | [a]Thickness (μm) | [b]$S_d/S_u$ at 24 h | [b]$S_d/S_u$ at 48 h |
|---|---|---|---|---|
| quinuclidine | 111 | 100 | 0.81 | 0.93 |
| triethylamine | 101 | 97 | 1.0 | 0.98 |
| tripropylamine | 143 | 100 | 0.67 | 0.87 |
| tributlyamine | 185 | 96 | ≤0.02[c] | ≤0.03[c] |
| triisobutylamine | 185 | 100 | 0.88 | 1.0 |
| triphenylmethane | 244 | 90 | ≤0.01[c] | ≤0.01[c] |
| MacMillan organocatalyst | 246 | 120 | 0.32 | 0.70 |
| triphenylphosphine | 262 | 100 | ≤0.02[c] | ≤0.03[c] |
| triphenylphosphine oxide | 278 | 84 | ≤0.02[c] | ≤0.03[c] |
| [d]tricyclohexylphosphine | 280 | 100 | ≤0.01[c] | ≤0.02[c] |
| binol | 286 | 96 | ≤0.01[c] | ≤0.02[c] |
| salen | 492 | 100 | ≤0.01[c] | ≤0.01[c] |
| methyl nonadecafluorodecanoate | 528 | 98 | 0.85 | 0.94 |
| nonaethylene glycol monododecyl ether | 583 | 130 | 0.04 | 0.33 |

[a]The thickness of the membrane.
[b]The ratio of the concentration of a molecule downstream to its concentration upstream.
[c]The molecule was not observed downstream of the membrane.
[d]Less than 10% of the tricyclohexylphosphine oxidized during these experiments.

Several conclusions can be drawn from the experiments in Table 5 and those presented earlier in this article. Whether a molecule will permeate PDCPD is clearly not dependent on molecular weight because the two molecules (MW: 528 and 583 g mol$^{-1}$) with highest molecular weights permeated the membranes but tributylamine (MW: 185 g mol$^{-1}$) and triphenylphospine (MW: 262 g mol$^{-1}$) did not permeate it. Both hydrophobic and hydrophilic molecules permeated the membranes and failed to permeate them. For instance, apolar molecules such as hexadecane, cholesterol, and tripropylamine permeated the membranes but tributylamine, triphenylphosphine, and tricyclohexylphosphine did not permeate them. Triphenylphosphine oxide was chosen because it is more polar than triphenylphosphine due to the presence of a polar P=O bond but possessed a similar shape. Triphenylphosphine oxide did not permeate the membranes at any detectable amount. The presence of amines or phoshines was not a distinguishing factor for whether a molecule would not permeate a membrane because triphenylmethane did not permeate it also.

Reason for the Retention of Selected Molecules by PDCPD Membranes

The flux of molecules through cross-linked polymeric membranes has been described theoretically by others through competing models. A general description that is agreed upon is that the diffusion, D, of a molecule to move from point to point in a polymer matrix depends exponentially on energy of activation, $E_a$, according to the equation $D=D_o\exp(-E_a/RT)$. In a highly cross-linked polymer matrix, small molecules can diffuse with little or no rearrangement of the polymer and the value for $E_a$ is small. Molecules with cross-sectional areas that are comparable or larger than the pores in a cross-linked polymer require substantial rearrangement of the polymer matrix that lead to high values for $E_a$ and low values for diffusion. Thus, the theoretical descriptions of flux and rates of diffusion make extensive use of cross-sectional areas to make predictions or to rationalize observed results. For instance, in a classic paper in 1982 by Berens and Hopfenberg the log of diffusion versus diameter and the square of diameter was plotted for 18 molecules that permeated polystyrene, polymethylmethacrylate, and polyvinyl chloride.[24] Neither plot was superior to the other due to scatter in the data, but it was clear that flux strongly depended on molecular diameter. In fact, the difference in flux for He (diameter=0.258 nm) and neopentane (diameter 0.580 nm) was approximately ten orders of magnitude. Unfortunately, this difference in flux was not studied for molecules larger than hexanes because of the vanishingly slow values for diffusion. At the other end of the molecular weight spectrum, the separation of polymers from small molecules using porous polymeric membranes is well known and used in applications such as to dialyze proteins from small molecules.

Most prior membranes to separate organic molecules used molecular weight or hydrophobic/hydrophilic effects to distinguish between molecules. For instance, ionic liquids will not partition into PDMS (a hydrophobic polymer) so they have no measurable flux through membranes composed of PDMS. Membranes that separate organic molecules possessing molecular weights from 100 to 600 g mol$^{-1}$ use molecular weight as the criterion for separation rather than cross-sectional area for two reasons. First, molecular weight is straightforward and easy to define but cross-sectional area is a more challenging concept to quantify. Second, separations based on molecular weight are successful and no allowances must be made for molecular size. Molecules below a MWCO permeate the membranes but molecules above the MWCO do not permeate and no exceptions are needed for effects based on cross-sectional area. The use of molecular weight as the criterion for separation does not imply any underlying importance to molecular weight in the mechanisms by which molecules are separated.

In Table 6 the molecular sizes of molecules that permeated or did not permeate PDCPD membranes are described. The surface area, molecular volume, critical dimension, and critical area were calculated by first minimizing the energy for each molecule using Spartan '08 V1.2.0. Next, the surface area and molecular volume were calculated from space filling models as described in the experimental section. The critical area was defined as the smallest rectangular cross-sectional area of a molecule that must be met for it to pass through a pore. For instance, a penny would be viewed on its side such that its cross-sectional area is a thin rectangle and distinctly smaller than the cross-sectional area for a sphere with the same radius as a penny. This rectangular cross-sectional area was determined using Sparan '08 V1.2.0 for each molecule as described in the experimental section. The critical dimension was the larger of the two distances used to find the critical area.

TABLE 6

The chemical and physical sizes of molecules that did or did not permeate PDCPD membranes.

| Molecule | Measurable flux | Molecular weight (g mol$^{-1}$) | Surface area (nm$^2$) | Molecular volume (nm$^3$) | Critical dimension (nm) | Critical area (nm$^2$) |
|---|---|---|---|---|---|---|
| triethylamine | Yes | 101 | 1.64 | 0.138 | 0.67 | 0.18 |
| quinuclidine | Yes | 111 | 1.46 | 0.131 | 0.42 | 0.21 |
| hexanoic acid | Yes | 116 | 1.65 | 0.135 | 0.28 | 0.067 |
| 1,6-diaminohexane | Yes | 116 | 1.80 | 0.146 | 0.28 | 0.067 |
| tripropylamine | Yes | 143 | 2.20 | 0.193 | 0.79 | 0.32 |
| nitrobenzaldehyde | Yes | 151 | 1.64 | 0.142 | 0.43 | 0.060 |
| tributlyamine | No | 185 | 2.86 | 0.249 | 0.92 | 0.50 |
| triisobutylamine | Yes | 185 | 2.82 | 0.248 | 0.80 | 0.38 |
| hexadecane | Yes | 226 | 3.52 | 0.307 | 0.28 | 0.067 |
| triphenylmethane | No | 244 | 2.92 | 0.285 | 0.95 | 0.51 |
| MacMillan organocatalyst | Yes | 246 | 2.96 | 0.279 | 0.62 | 0.36 |
| triphenylphosphine | No | 262 | 2.92 | 0.286 | 0.95 | 0.61 |
| triphenylphosphine oxide | No | 278 | 3.11 | 0.299 | 0.95 | 0.61 |
| tricyclohexylphosphine | No | 280 | 3.24 | 0.323 | 0.92 | 0.57 |
| binol | No | 286 | 2.99 | 0.298 | 0.72 | 0.51 |
| cholesterol | Yes | 387 | 4.49 | 0.454 | 0.55 | 0.28 |
| salen | No | 492 | 6.36 | 0.630 | 1.22 | 0.79 |
| methyl nonadecafluorodecanoate | Yes | 528 | 3.39 | 0.312 | 0.43 | 0.14 |
| nonaethylene glycol monododecyl ether | Yes | 583 | 7.37 | 0.640 | 0.28 | 0.067 |
| Co(salen) | No | 662 | 7.06 | 0.699 | 1.22 | 1.15 |

It is clear from Table 6 that the critical dimension and area both correlate to whether a molecule will permeate PDCPD. Molecules that permeated through PDCPD membranes had critical dimensions and areas of less than 0.80 nm and 0.38 nm$^2$, but molecules that did not flux through the membranes had critical dimensions and areas of at least 0.92 nm and 0.50 nm$^2$. Surprisingly, a difference in critical dimension or area significantly less than a factor of two had a substantial impact on the flux of molecules through PDCPD. The difference in permeation was striking. Molecules with no measurable flux through the membranes were not detected in the solvent downstream of the membrane and possessed values for flux 10$^4$ to 10$^5$ times slower than the molecules that did permeate the membranes.

The difference in permeation of tripropylamine, triisobutylamine, and tributylamine illustrates the importance of cross-sectional area (Table 6). Triisobutylamine and tributylamine are constitutional isomers that possess the same molecular weight and similar surface areas and volumes. The major difference between triisobutylamine and tributylamine are their cross-sectional areas, triisobutylamine (0.38 $nm^2$) has a similar cross-sectional area to tripropylamine (0.32 $nm^2$), but the cross-sectional area of tributylamine (0.50 $nm^2$) is larger. In flux experiments tripropylamine and triisobutylamine permeated the membranes but tributylamine did not permeate. These experiments demonstrate the selectivity of the membranes and the need to consider cross-sectional area as the important parameter for the flux of molecules.

Extraction of Nitrobenzaldehyde from Binol.

The ability to efficiently extract a molecule through a PDCPD membrane while retaining a second molecule was studied using nitrobenzaldehyde and binol. It is important that a high yield of a molecule be obtained after permeation through a membrane, and it is also important that molecules that are retained by a membrane do not remain embedded with the PDCPD matrix. In some applications it will also be important that molecules that are retained be recycled and accessible after separations. These issues were initially addressed by studying the extraction of nitrobenzaldehyde from binol.

In these experiments, a mixture of nitrobenzaldehyde (484 mg) and binol (264 mg) were added upstream of a membrane in $CH_2Cl_2$ and extracted downstream using $CH_2Cl_2$. After 24 h, the solvent downstream was removed from the apparatus and fresh $CH_2Cl_2$ was added downstream. After an additional 24 h, the solvent downstream was removed and the extracted yield of nitrobenzaldehyde through two cycles calculated to be 90% with no detectable level of binol contamination. The solvent upstream was also removed from the apparatus and the amount of binol in solution was only 17% of the original amount of binol added to the apparatus. The remainder of the binol was in the PDCPD matrix and had to extracted. A fresh aliquot of $CH_2Cl_2$ was added on the upstream side of the membrane and allowed to sit for 24 h. The $CH_2Cl_2$ was removed from the apparatus to yield an additional 39% of the original amount of binol. The membrane was cut into pieces and immersed in $CH_2Cl_2$ to further extract binol. After 24 h an additional 13% of the original amount of binol was isolated which yielded a total isolation of 69% of the original amount of binol. When this experiment was repeated the amount of nitrobenzaldehyde that was isolated downstream of the membrane was 87% and the amount of binol that was isolated was 72%.

These experiments demonstrated that high yields of clean nitrobenzaldehyde could be isolated from significant quantities of binol. Furthermore, most of the binol partitioned into the PDCPD membranes during these experiments, but it was readily extracted into fresh solvent where it was isolated and characterized. The partitioning of binol from solvent into the membranes was a reversible process that allowed much of the binol to be isolated at the end of these experiments.

Extraction of Cholesterol from Triphenylphosphine, Tricyclohexylphosphine, and Tributylamine Using a PDCPD Membrane To demonstrate the selective permeation of a high molecular weight compound from low molecular weight compounds based on their different cross-sectional areas, the extraction of cholesterol (3 mmol) from a mixture of triphenylphosphine (2 mmol), tricyclohexylphosphine (2 mmol), and tributylamine (3 mmol) was investigated. These four molecules were dissolved in 25 mL of $CH_2Cl_2$ and added to one side of a membrane and 23 mL of $CH_2Cl_2$ was added downstream of the membrane. A 2 mL aliquot was immediately removed from the upstream side and characterized by $^1H$ NMR spectroscopy to show the initial mixture of molecules. After 48 h aliquots were removed from both sides of the membrane and characterized by $^1H$ NMR spectroscopy.

The $^1H$ NMR spectra demonstrated that cholesterol was selectively extracted from the solvent mixture. The $^1H$ NMR spectra of the initial mixture of the four molecules, the organic molecules upstream of the membrane after 48 h, the organic molecules downstream of the membrane after 48 h, and a sample of pure cholesterol are all shown. Some oxidation of the $PCy_3$ occurred during the extraction, but the $OPCy_3$ was also retained by the membrane. The $^1H$ NMR spectrum of the organic product downstream of the membrane after 48 h matched the $^1H$ NMR spectrum of cholesterol and no evidence of $PCy_3$, $OPCy_3$, $PPh_3$, or $NBu_3$ were seen downstream of the membrane. This result was remarkable considering that the molecular weight of cholesterol (MW: 387 g $mol^{-1}$) was much higher than the other molecules (185-296 g $mol^{-1}$).

Recycling of PDCPD Membranes

The ability to recycle PDCPD membranes was studied using nitrobenzaldehyde and binol. In this experiment both nitrobenzaldehyde and binol were added upstream of a membrane and nitrobenzaldehyde was isolated downstream of the membrane. Nitrobenzaldehyde was extracted three times with fresh solvent over 72 h. After 72 h the binol that had permeated into the PDCPD matrix was extracted by the addition of fresh solvent upstream of the membrane. After the first cycle was complete, fresh nitrobenzaldehyde and binol were added upstream of the membrane and the process was repeated with the same membrane.

A total of three cycles were completed and the extraction of nitrobenzaldehyde was high for each cycle. In the three cycles nitrobenzaldehyde was isolated in 99%, 79%, and 72% yield and the binol was isolated in 40%, 4%, and 82% yield. The fourth cycle was not finished because binol began to permeate the membrane. Notably, nitrobenzaldehyde was isolated as a clean product without any impurities from binol. The binol contained some nitrobenzaldehyde as an impurity and had to be extracted from the PDCPD membrane. This experiment demonstrates that the membranes can be recycled over several cycles, and future work will study how to optimize this process.

CONCLUSIONS

New technologies originate from new materials. Most past examples of membranes that separate organic molecules with molecular weights from 100-600 g $mol^{-1}$ use the concept of a molecular weight cutoff that hinder the use of these membranes to separate catalysts from products of a reaction. Many catalysts and ligands for metals have modest molecular weights that place a real limitation on what molecules they can be separated from. The problem that PDCPD membranes solve is that they are the first membranes that separate molecules with molecular weights between 100 and 600 g $mol^{-1}$ based on the concept of a cross-sectional area cutoff rather than a molecular weight cutoff. These membranes are significant because of the large number and importance of molecules within this range of molecular weights and the need to separate them in the chemical industry. For instance, many reactions require metal catalysts with ligands such as phosphines. It is important that the final product be clean of all but ppm levels of impurities of metal and phosphines so several purification steps are often required to clean the product. PDCPD membranes offer a new solution to cleaning the products and recycling the catalysts.

The surprising aspect of PDCPD membranes is not that they separate molecules based on cross-sectional area because cross-sectional area is well known as a critical parameter that affects flux. Rather, it was surprising that these membranes were the first to have a critical importance of cross-sectional area for the flux of molecules within this range of molecular weights. In addition, the difference in permeation was very large; molecules that did not permeate the membranes were undetected in the solvent downstream of the membrane and possessed values for flux that were $10^4$ to $10^5$ times slower than molecules that permeated the membranes. The origins of the selectivity of these membranes lies in the size and distribution of pore sizes that result when the polymer is cross-linked, and these materials properties will be studied in more detail in future work. An understanding of what makes PDCPD so unique may allow the design of more membranes with similar separations but faster flux.

All publications, patents, and patent documents discussed herein are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method comprising contacting a membrane with a feed solution comprising a) a first component having a molecular weight in the range of from about 100 g mol$^{-1}$ to about 600 g mol$^{-1}$ and a critical area of less than about 0.40 nm$^2$ and b) a second component having a molecular weight in the range of from about 100 to about 600 grams g mol$^{-1}$ and a critical area of greater than about 0.50 nm$^2$ so that the feed solution is fractionated into a permeate comprising the first component and a retentate enriched in the second component, wherein the membrane comprises a highly cross-linked polydicyclopentadiene matrix and wherein the critical area of the first component is the lowest rectangular cross-sectional area of the first component in its energy minimized conformation and the critical area of the second component is the lowest rectangular cross-sectional area of the second component in its energy minimized conformation.

2. The method of claim 1 wherein the ratio of crosslinked double bonds to uncrosslinked double bonds in the highly cross-linked polydicyclopentadiene matrix is at least about 3:2.

3. The method of claim 1 wherein the ratio of crosslinked double bonds to uncrosslinked double bonds in the highly cross-linked polydicyclopentadiene matrix is at least about 4:1.

4. The method of claim 1 wherein the first component is an organic compound.

5. The method of claim 1 wherein the first component is a catalyst.

6. The method of claim 1 wherein the second component is an organic compound.

7. The method of claim 1 wherein the second component is a catalyst.

8. The method of claim 1 wherein the feed solution comprises an organic solvent.

9. The method of claim 1 wherein the feed solution comprises an aprotic organic solvent.

10. The method of claim 1 wherein the feed solution comprises water.

* * * * *

UNITED STATES PATENT AND TRADEMARK OFFICE
CERTIFICATE OF CORRECTION

| | | |
|---|---|---|
| PATENT NO. | : 8,778,186 B2 | Page 1 of 1 |
| APPLICATION NO. | : 13/546252 | |
| DATED | : July 15, 2014 | |
| INVENTOR(S) | : Bowden et al. | |

It is certified that error appears in the above-identified patent and that said Letters Patent is hereby corrected as shown below:

In the Specification,

In Column 1, line 6, under Government Funding:

Replace:

This work was supported by the National Science Foundation Grant CHE-0848162. The United States Government has certain rights to this invention.

With the following revised paragraph:

This invention was made with government support under CHE-0848162 awarded by the National Science Foundation. The government has certain rights in the invention.

Signed and Sealed this
Twelfth Day of May, 2015

Michelle K. Lee
*Director of the United States Patent and Trademark Office*